Figure 1:
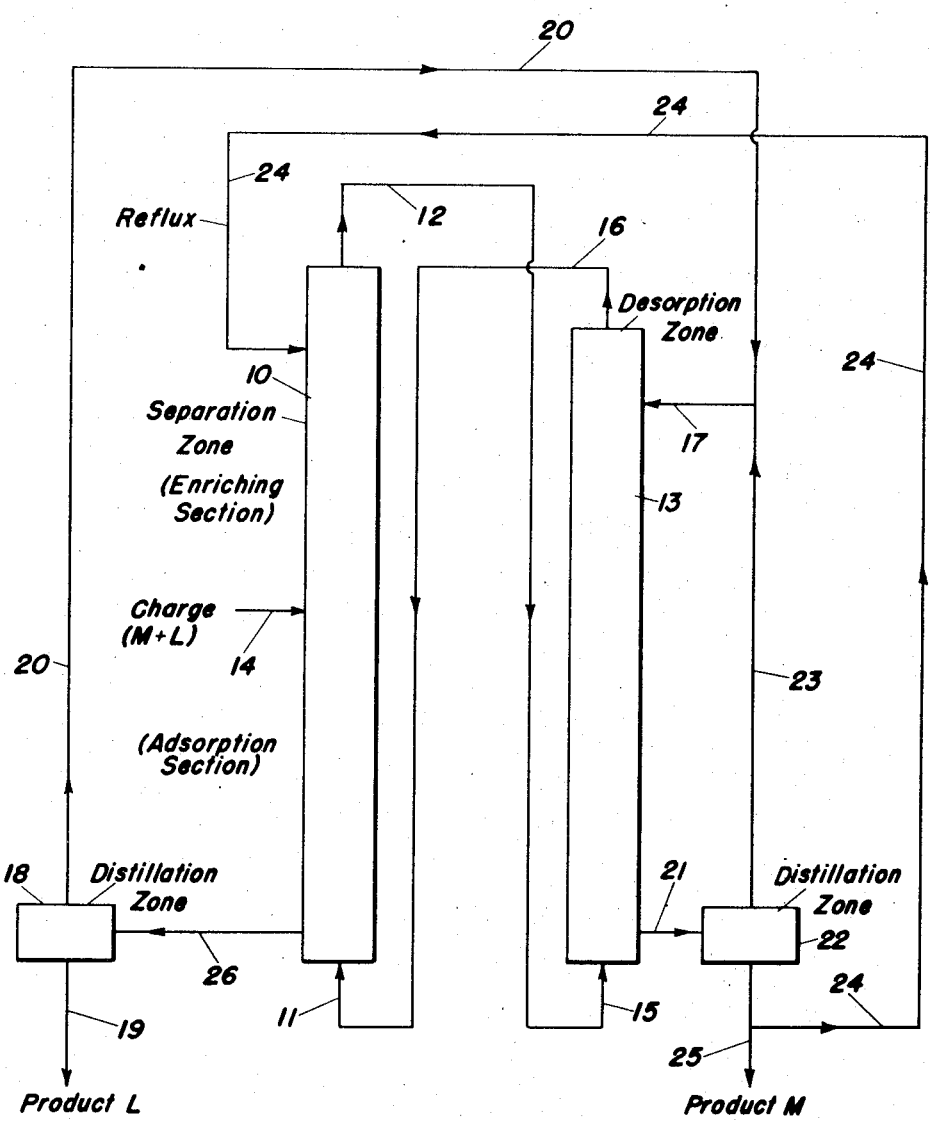

Patented Aug. 21, 1951

2,564,717

UNITED STATES PATENT OFFICE 2,564,717

CONTINUOUS ADSORPTION PROCESS

John L. Olsen, Upland, Pa., assignor to Sun Oil Company, Philadelphia, Pa., a corporation of New Jersey Application April 28, 1949, Serial No. 90,108

5 Claims. (Cl. 260—674)

This invention relates to the separation of organic materials by selective adsorption. More particularly it relates to a continuous method for effecting separation of components from a liquid organic mixture, in which method a selective adsorbent is utilized in the form of a moving bed.

It is well recognized that different types of organic compounds often have different adsorbabilities on various known adsorbents and that such compounds may be separated to an extent from each other by treatment of a charge mixture with a suitable adsorbent. For example, it is known that highly polar organic compounds may be removed from less polar or non-polar organic substances by selective adsorption on various adsorbents. Likewise it is known that hydrocarbons may be selectively separated according to chemical type by means of certain adsorbents, such as silica gel or activated carbon. Usually the hydrocarbons which are less saturated, i. e. which have more double bonds per molecule, are adsorbed preferentially to those which are more highly saturated. Thus the affinity of adsorbents for the several types of hydrocarbons usually increases in the following order: saturate hydrocarbons (i. e. paraffins and naphthenes); olefins; aromatics. The treatment of a mixture composed of two or more of such types of hydrocarbons with a suitable adsorbent accordingly will tend to effect separation according to chemical type. For instance, aromatics or olefins or both can be preferentially separated from saturate hydrocarbons, or aromatics can be selectively removed from olefins, by means of suitable known adsorbents.

The usual procedure for carrying out selective adsorption operations with a liquid charge mixture is merely to filter the charge through a stationary body of the adsorbent until its effectiveness for making a further separation of the components has decreased to an uneconomic level. Introduction of the charge is then discontinued and the adsorbate is removed from the contact mass. This may be accomplished by washing with a suitable solvent, heating, blowing with a gas such as steam or flue gas, or by a combination of such methods. The adsorbent is then reused for further treatment of charge material in another cycle of operation.

The above described prior art procedure utilizing the adsorbent in the form of a stationary bed entails certain inherent disadvantages, especially in that the composition of product from the adsorption zone varies throughout the cycle therefore requiring proper selection and segregation of product cuts. Also, an intermediate portion of the filtrate product is apt to be of composition approaching that of the charge thus limiting the yields of desired product. Further, the decline in activity of adsorbent during use over a prolonged time necessitates shutting down the operation for replacement, as continuous replacement in amount sufficient to maintain the desired activity is not practicable where the adsorbent is maintained as a stationary body.

The present invention is directed to a continuous process for effecting separations by selective adsorption in which the adsorbent is utilized in the form of a moving bed. The process may be so regulated as to effect substantially any desired degree of separation between the charge components, and the products obtained under any selected set of operating conditions will be of substantially constant composition at all times during the operation. The process also lends itself to continuous replacement of the adsorbent, if desired, so that the activity of the circulating adsorbent may be maintained at a constant level.

Briefly, the process according to the invention comprises continuously introducing adsorbent into a separation zone and passing it therethrough in the form of a moving bed. A stream of liquid charge material is continuously fed into the moving bed at a locus intermediate the ends of the separation zone. Adsorbent, containing the more adsorbable component, is withdrawn from the opposite end from which it was introduced and is passed to a desorption zone and therein treated with a suitable organic solvent desorbing agent to displace the adsorbate. The treated adsorbent, wet with such desorbing agent, is returned directly to the separation zone for re-use. Adjacent the end of the separation zone at which the adsorbent is admitted, a liquid mixture comprising the less adsorbable component and desorbing agent is withdrawn and is then subjected to treatment adapted to separate the desorbing agent, thereby yielding the less adsorbable component in enriched form as one product of the process. From the desorption zone a mixture of the more adsorbable component and desorbing agent is obtained. This mixture is also subjected to treatment adapted to remove the desorbing agent, thus yielding the more adsorbable component in enriched form. A portion of the latter product is continuously introduced as reflux into the separation zone adjacent the end at which the adsorbent is removed, the remainder being withdrawn as the other product of the process.

Any adsorbent which will preferentially adsorb one type of component in the particular charge mixture to be separated may be used in conducting the process. Preferably an adsorbent which has a high adsorption capacity and a high degree of selectivity between the components of the charge mixture is employed. Among the commercially available adsorbents silica gel and activated carbon have adsorptive properties which are especially suitable for separating many types of organic mixtures to which the present process is applicable. Silica gel is especially effective for selectively adsorbing a more highly polar compound from a less highly polar compound or for separating hydrocarbons having different degrees of saturation. Activated carbon is also effective for separating hydrocarbons according to chemical type and in some instances will, to an extent, separate hydrocarbons of the same type according to molecular weight. In many cases activated carbon is capable of selectively adsorbing non-polar compounds, for example hydrocarbons, from polar compounds, for example alcohols, ethers, esters, ketones, aldehydes, etc. It is to be understood, however, that the process according to the invention may be practiced with other types of adsorbents and in fact with any other adsorbent which exhibits a substantial selectivity between the components of the particular charge mixture to be treated.

Figure 2:
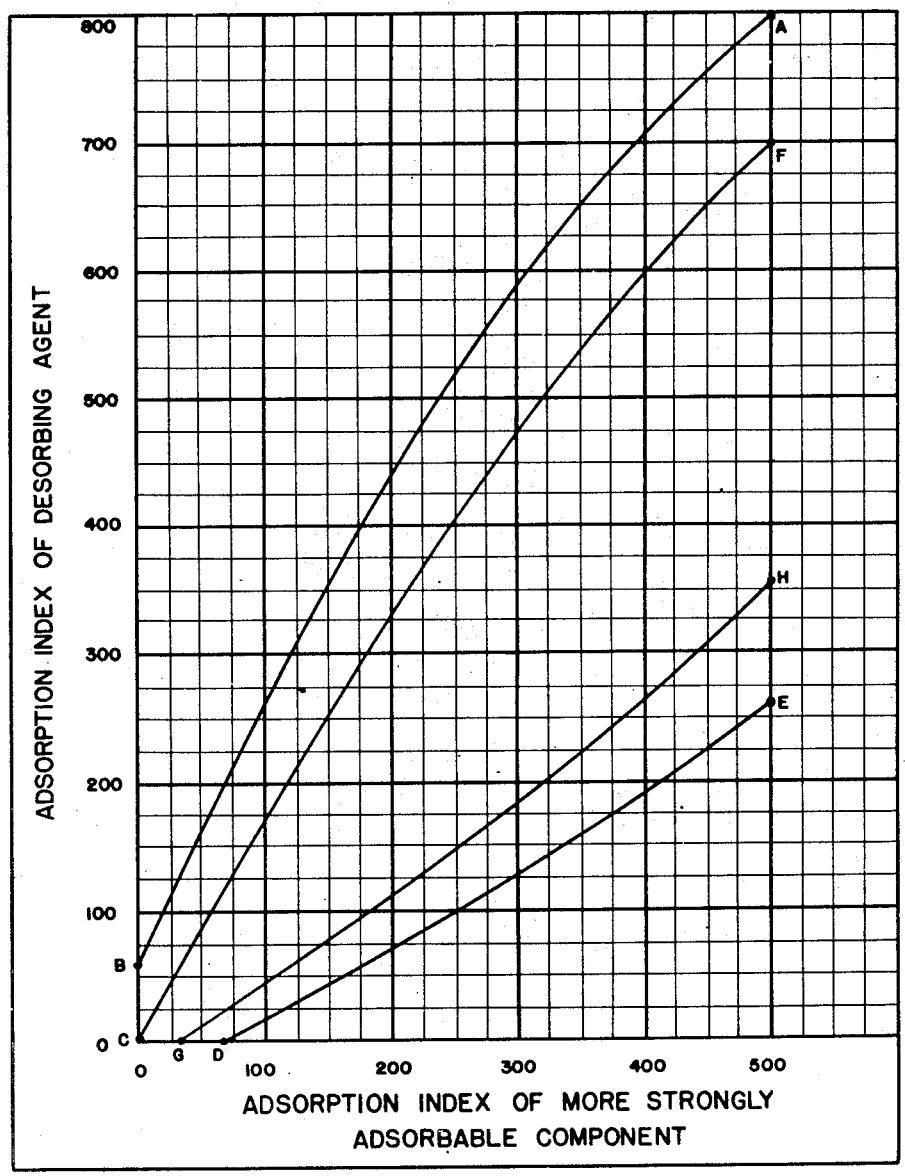
Figure 3:
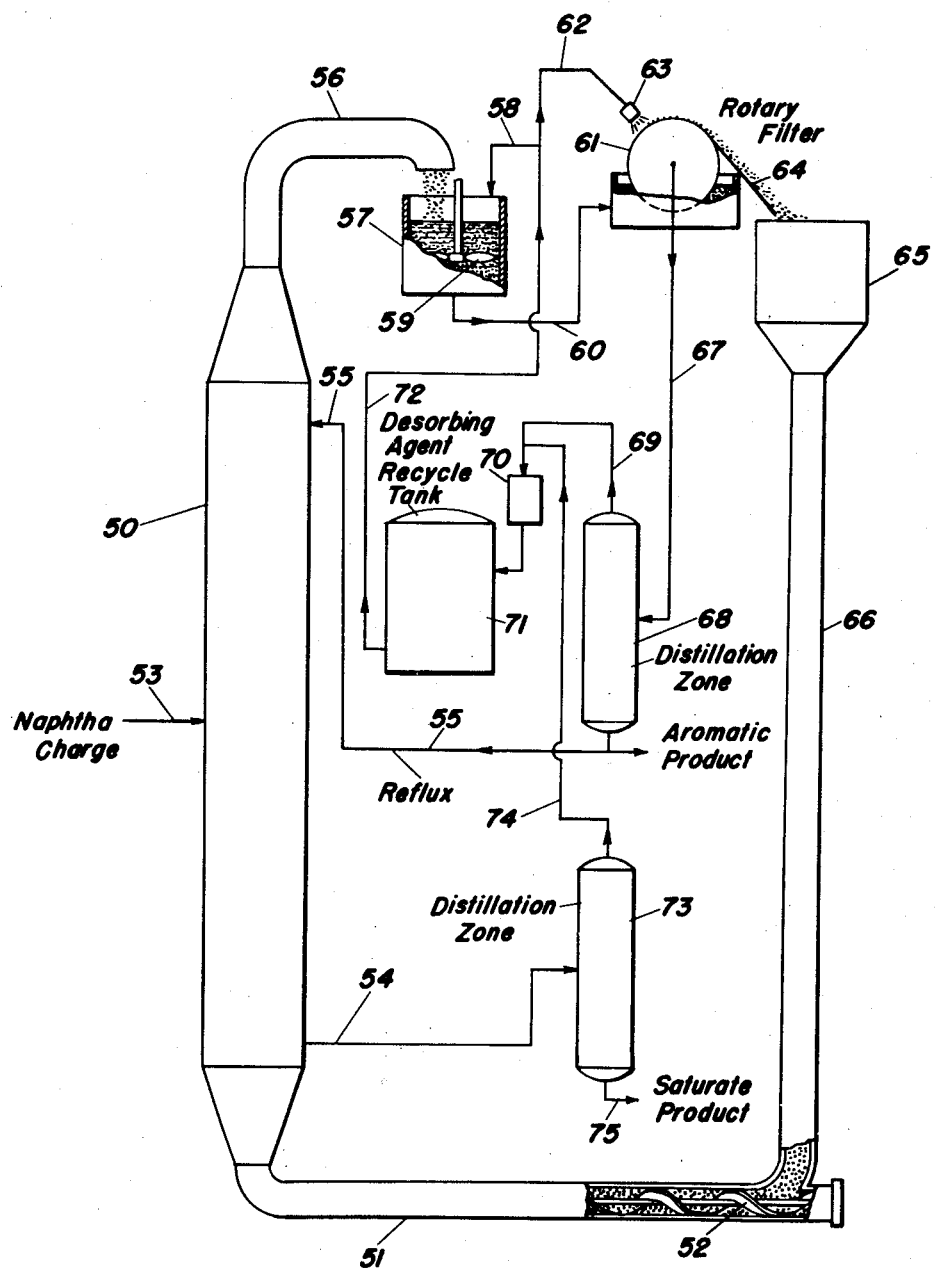

The description which follows is made with reference to the accompanying drawings in which:

Fig. 1 is a simplified diagrammatic illustration of the process;

Fig. 2 constitutes a chart useful in selecting a suitable desorbing agent for the process; and Fig. 3 is a diagrammatic view partly in section illustrating an installation adapted for practicing the process.

Referring first to Fig. 1, a separation zone 10 is illustrated in the form of an elongated column through which the adsorbent continuously passes as a moving bed. The adsorbent, carrying adsorbed organic solvent as hereinafter specified, is introduced continuously through line 11 into the bottom of the column, moves upwardly through the column as a moving bed, and passes out of the top through line 12.

The charge mixture, which for purposes of illustration may be considered to be composed of components M and L, with M being the more strongly adsorbable component, is fed in liquid form continuously into column 10 through line 14 at a level spaced substantially away from either end of the column, as illustrated in Fig. 1. As the charge mixture comes into contact with the moving adsorbent bed, component M will tend to be selectively adsorbed and carried upwardly while component L will tend to flow downwardly toward the bottom. The adsorbent which is withdrawn from the top of column 10 through line 12 carries with it adsorbate, which is composed mainly of component M and is passed to a desorption zone 13 which, according to the embodiment of Fig. 1, may also be an elongated column. The adsorbent-adsorbate mixture enters the bottom of column 13 through line 15 and again passes upwardly as a moving bed, leaving the top of the column through line 16. An organic solvent, having characteristics as hereinafter specified, is introduced into the upper part of the column through line 17 and passes downwardly countercurrent to the moving bed, thereby displacing the adsorbate. Thus, the adsorbent leaving the top of column 13 contains essentially only such organic solvent as the adsorbed phase. The wet adsorbent is then returned through line 11 directly to the bottom of column 10, thereby completing the cycle.

In the bottom portion of column 10 the desorbing agent tends to be displaced from the adsorbent. Adjacent the bottom of the column a product stream which contains component L in enriched form and also contains desorbing agent is withdrawn through line 26 and is then subjected to any suitable treatment for removing the desorbing agent from component L. A particularly convenient manner for effecting such separation is by distillation, as illustrated diagrammatically by distillation zone 18. The resulting product rich in component L is withdrawn from the system through line 19 while the desorbing agent removed from distillation zone 18 is returned through line 20 for re-use in the process.

From the bottom of desorbing column 13 a stream composed of desorbing agent and component M in enriched form is withdrawn through line 21 and is sent into a second distillation zone 22 wherein the desorbing agent is separated. The recovered desorbing agent flows through line 23 back to line 17 for re-use in separation zone 10. From the bottom of distillation zone 22 a product comprising component M in enriched form is withdrawn. A portion of this is sent through line 24 back to separation zone 10, being introduced into the upper portion thereof as reflux. The remainder is removed from the system by means of line 25 as the other product of the process.

The introduction of reflux through line 24 into column 10 is generally essential to effect the desired degree of separation. Its function is to cause a transfer of M from the fluid phase within the interstices of the bed in the upper part of column 10 to the adsorbed phase, thus causing a reverse transfer of component L from the adsorbent. This tends to lower the concentration of L on the adsorbent issuing from the top of the column, thereby resulting in a higher degree of separation between the components than otherwise would be possible.

While as illustrated in Fig. 1 the adsorbent moves upwardly through the separation and desorption zones, it is to be understood that the process may likewise be conducted with the adsorbent moving downwardly. In such case the reflux would be introduced at the bottom of separation zone 10 and product L in admixture with desorbing agent would be withdrawn at the top; while in the operation of desorber column 13, desorbing agent would be fed into the bottom and the mixture of desorbing agent and adsorbate would be withdrawn near the top. In operating in this manner provision should be made for removing adsorbent from the bottom of each column without at the same time removing non-adsorbed liquid. This may be done by withdrawing the adsorbent through vertically extending seal legs of sufficient height to prevent overflow of liquid therefrom and to permit drainage of non-adsorbed liquid from the adsorbent before it leaves each seal leg.

The above described process is somewhat analogous in principle to the conventional process for conducting fractional distillation although not strictly so. However, such analogy may be drawn as an aid in understanding the fundamental principles and the factors upon which the effectiveness of separation depends. It is well recognized that in order to attain a desired degree of separation of a mixture in fractional distillation the number of theoretical plates or transfer units employed and the reflux ratio used are important and interrelated. For any particular separation there is a minimum number of transfer units (corresponding to an infinite reflux ratio) and a minimum reflux ratio (corresponding to an infinite number of transfer units) that must be employed. These depend upon the relative volatility of the components being separated. As the number of transfer units is increased the necessary reflux ratio for obtaining the separation decreases. In practice the number of plates or transfer units and the corresponding reflux ratio are selected to give the most economical operation.

In the present process the selectivity of the absorbent or in other words the relative adsorj-abilities of the components is comparable to relative volatilities in distillation. The fluid phase in the interstices of the bed and the adsorbed phase on the adsorbent are analogous, respectively, to the liquid and vapor within a distillation column; and transfer of material between the fluid phase and the adsorbed phase is equivalent to the transfer between liquid and vapor in distillation. The reflux which is added to the top of the separation column is similar to reflux used in distillation. There are a minimum number of transfer units and a minimum reflux ratio, dependent upon the relative adsorbabilities of the components being separated, below which values the particular degree of separation desired cannot be accomplished. Accordingly, the required number of transfer units and reflux ratio for operating the present process to achieve any given degree of separation may be determined from relative adsorbability data by means of engineering calculations similar to those used for distillation operations. In such manner the rates of addition and withdrawal of streams in the process and the required height of the column may be ascertained. The rate of movement of adsorbent through the column determines, together with its adsorptive capacity, the rate at which adsorbate moves upwardly, just as the boil-up rate in distillation determines the rate of flow of vapors. It is to be noted, however, that the addition of a third component (desorbing agent) which is present in adsorbed phase on the adsorbent fed into the bottom of the column constitutes a feature which has no analogy in conventional fractional distillation. While this feature complicates the calculations somewhat, nevertheless such calculations may be made upon principles fundamentally the same as used for distillation processes.

For convenience in describing the process as illustrated in Fig. 1 the separation zone or column 10 may be considered as comprising two different sections. The lower portion of the column, extending from the locus of introduction of the charge (line 14) down to the locus of removal of the mixture of component L and desorbing agent (line 17) may be referred to as an adsorption section. The upper portion of the column, extending from the locus of introduction of the charge up to the locus of introduction of reflux (line 24) may be considered an enriching section. Pursuing further the analogy to distillation, the adsorption section is similar to the stripping section of a distillation column while the enriching section is analogous to a distillation enriching section. Desorption zone 13 functions in certain aspects like the condenser for a distillation column, although it is not strictly analogous thereto due to the fact that a third component (desorbing agent) is introduced.

Desorbing agents which can be user in practicing the above described process may be classified generally as liquid organic solvents, that is, organic liquids in which the charge components are soluble or at least are soluble to such extent that there will be complete miscibility at the concentrations prevailing within the desorption and separation zones. It is preferable to use as desorbing agent a solvent which has complete miscibility with the charge components at all concentrations. When distillation is to be used to remove the desorbing agent from the product, it should have a boiling point substantially different from the charge components to permit ready separation. It is also preferable to select a desorbing agent which has a low viscosity so that its diffusion rate in the separation and desorption zones will not be excessive. It is essential that the desorbing agent selected have adsorbability characteristics falling within certain limits with respect to the adsorbability of the more adsorbable charge component (M), as more fully explained below. The desorbing agent may, within limits, be either less strongly adsorbable or more strongly adsorbable than component M on the particular adsorbent being used in the process. However, if it is too weakly adsorbed relative to component M, it will not be effective to displace M from the adsorbent in the desorption zone unless an unreasonably large proportion of desorbing agent is employed. On the other hand, if it is too strongly adsorbed, it will not be displaceable from the wet adsorbent returned to the bottom of the separation zone and therefore will render the adsorbent incapable of adsorbing charge material.

For the purpose of specifying the adsorbability characteristics of the desorbing agent to be used according to this invention, the concept of adsorption index is herein utilized. Such means of defining adsorptive properties of compounds have been described in Hirschler et al. Patent No. 2,441,572 in connection with another type of adsorption process utilizing a fixed adsorbent bed. For the present purpose the adsorption index of a compound may be defined as the apparent number of cubic centimeters of the compound adsorbed by one kilogram of the adsorbent when the latter is in equilibrium with a solution consisting of 0.2% of such compound and 99.8% of isooctane. (For a detailed discussion of the determination of adsorption index reference should be made to the above-mentioned patent to Hirschler et al.) The adsorption index may thus be considered as the amount of the compound adsorbed from a standard liquid at a standard concentration and therefore a measure of the affinity of the particular adsorbent used for the compound. A low adsorption index indicates a weakly adsorbable compound while a high adsorption index indicates one that is strongly adsorbable. The adsorption index for a given compound will vary of course with different types of adsorbents and in fact will vary even with different lots of the same type of adsorbent where the lots have different inherent activities. With any given adsorbent, however, the adsorption index for a particular compound will be fixed. Isooctane has been arbitrarily chosen as the standard liquid to use in determining adsorption index for the present purpose, but as a general rule other saturate hydrocarbons may be substituted for isooctane without substantially affecting the values obtained.

In determining whether an organic solvent will be suitable as desorbing agent where a particular charge mixture is to be separated in accordance with the invention, reference should be had to Fig. 2 which discloses a chart defining the upper and lower limits of adsorbability for the desorbing agent. To utilize Fig. 2 it is first necessary to know the adsorption index of the organic solvent in question and also the adsorption index of the more strongly adsorbable component (M) of the charge. The chart shows the maximum and minimum permissible limits of adsorption index for the solvent as a function of the adsorption index of component M and also preferred maximum and minimum values to insure more economic operation. The upper permissible limit is defined by the line AB, while the lower permissible limit is defined by the lines CD and DE. Thus if the point fixed by the adsorption index values for the two materials falls within the area ABCDE, the organic solvent will be operable as a desorbing agent in the process. Preferred desorbing agents, however, have an upper limit defined by the line FC and a lower limit defined by the lines CG and GH. Desorbing agents having the preferred characteristics will therefore fall within the area FCGH. As a general rule, the best desorbing agents to use are those having adsorption indices approximately the same as the more adsorbable component.

As a more specific illustration of the use of Fig. 2, assume for example that a mixture of M and L is to be separated and that M, the more adsorbable component, has an adsorption index of 150. By reference to Fig. 2, it can be seen that the desorbing agent used must have an adsorption index between about 42 and 350. Any organic solvent which is found to have an adsorption index within these limits would therefore be operative in the process. It would be preferable, however, to use a solvent having an adsorption index between about 77 and 250 so as to insure efficient operation.

As a further illustration, assume that a naphtha fraction boiling from say 300–400° F. and composed of aromatic and saturate hydrocarbons is to be separated into an aromatic product and a saturate product, employing silica gel as the adsorbent. In such case the aromatics may have an adsorption index in the neighborhood of 30, subject to some variation dependent upon the inherent activity of the silica gel used, while the adsorption index of the saturates based on isooctane will be approximately zero. Reference to Fig. 2 shows that the desorbing agent should have an adsorption index within the range of 0–120 and preferably within the range of 0–53. Suitable organic solvents for making the separation accordingly may readily be selected from compounds whose adsorption indices have been determined with silica gel of the same activity. Some typical values for various organic solvents with such silica gel are given in the accompanying table. The data show that there are numerous organic solvents which could be used for making the desired separation and that many of them come within the preferred range. Isoamyl chloride is shown to have adsorption properties near the upper limit of the preferred range. Solvents having adsorption indices relatively close to that of the aromatics being separated, such as, for example, chlorbenzene, methylene chloride, benzene, n-propylbromide, brombenzene, tert-butylchloride, toluene and ethylene dichloride, would be especially satisfactory desorbing agents in the process.

TABLE I

*Adsorption indices of various organic solvents on silica gel*

| Compound | Adsorption Index |
| --- | --- |
| saturate hydrocarbons | about 0 |
| cyclohexene | 3.3 |
| trichloroethylene | 5.8 |
| 3-chloropentane | 8.2 |
| m-chlorobenzotrifluoride | 8.6 |
| chloroform | 12 |
| o-dichlorbenzene | 15 |
| chlorbenzene | 19 |
| methylene chloride | 21 |
| benzene | 24 |
| n-propylbromide | 26 |
| s-tetrachlorethane | 28 |
| brombenzene | 30 |
| tert-butylchloride | 31 |
| toluene | 31 |
| ethylene dichloride | 38 |
| iso-amyl chloride | 50 |
| benzotrichloride | 54 |
| 1,2,3-trichloropropane | 55 |
| benzyl chloride | 64 |
| benzal chloride | 90 |
| 1,4-dichlorobutane | 91 |
| nitropropane | 101 |
| benzyl mercaptan | 136 |
| dioxane | 145 |
| nitrobenzene | 162 |
| m-nitrobenzotrifluoride | 181 |
| methyl salicylate | 189 |
| benzaldehyde | 190 |
| ethyl acetate | 195 |
| benzyl ether | 198 |
| pyridine | 204 |
| diisobutylketone | 212 |
| diisopropyl ether | 212 |
| m-aminobenzotrifluoride | 228 |
| cyclohexanol | 252 |
| sec-butyl alcohol | 260 |
| ethyl alcohol | 260 |
| 2-methyl-2,4-pentanediol | 279 |
| n-butyl amine | 283 |
| morpholine | 286 |

One type of apparatus adapted for carrying out the present process is illustrated in Fig. 3. By way of illustration the process will be described for separating a gasoline or naphtha fraction, for example, a naphtha boiling in the range of 300–400° F., into an aromatic product and a saturate hydrocarbon product. For such separation silica gel or activated carbon would be a particularly suitable adsorbent. In the present description the process will be considered as utilizing silica gel as the adsorbent and the desorbing agent will be considered to be a relatively low boiling aromatic, for example, benzene.

In Fig. 3 the separation zone is illustrated in the form of a vertical column 50 which is tapered at its upper and lower ends through which particulate or finely divided silica gel is continuously passed in the form of a moving bed. The silica gel is fed into the bottom of the column through line 51 by means of a screw conveyor 52 which is capable of exerting sufficient pressure to move the gel as a compact mass or bed upwardly through column 50. The naphtha charge is continuously fed as a liquid into the moving bed through line 53. Upon contacting the silica gel the aromatic components of the naphtha tend to be selectively adsorbed and carried upwardly while the saturate components tend to flow downwardly. A stream of saturate-rich hydrocarbon product in admixture with benzene is withdrawn near the bottom of the column through line 54. Reflux is continuously introduced into the upper part of the column through line 55, its function being to preferentially displace any saturate hydrocarbons carried in the adsorbed phase into the upper part of the column and prevent such hydrocarbons from being carried out the top of the column with the silica gel. Withdrawal of the saturate product stream through line 54 at the bottom is regulated at such a rate that a liquid level is maintained within the column at a level above that at which reflux is introduced (line 55) but below outlet line 56 at the top. Thus the silica gel which passes from the top of the column through line 56 carries with it mainly only those hydrocarbons which are in adsorbed phase without a substantial amount of non-adsorbed hydrocarbons.

The embodiment of Fig. 3 utilizes another type of apparatus in place of a column to effect displacement of the adsorbed aromatics from the silica gel. The wet silica gel issuing from line 56 falls into a tank 57 which serves as a suspension chamber. A stream of the desorbing agent, benzene, which is supplied from recycle tank 71 by means of lines 72 and 58, is also fed into tank 57. The latter is provided with a stirrer 59 for agitating the mixture so as to suspend the silica gel particles in the benzene. The amount of benzene added through line 58 need be only sufficient to permit the mixture to take the form of a suspension rather than a wet mass. Contact of the benzene with the silica gel in tank 57 will cause a partial displacement of the aromatics from the gel and replacement thereof through transfer of benzene to the adsorbed phase.

The suspension is continuously pumped from the bottom of tank 57 through line 60 to a rotary vacuum filter 61, where the liquid is filtered off from the gel. The filter cake is continuously washed with a further amount of benzene which is provided through line 62 and is sprayed on the surface of the filter cake by means of one or more spray nozzles indicated by numeral 63. Sufficient benzene should be used at this point to effect substantially complete displacement of charge aromatics from the gel, leaving essentially only benzene in adsorbed phase.

The washed filter cake is continuously scraped off of the drum surface of filter 61 by means of scraper 64 which directs the silica gel into hopper 65. The recovered adsorbent, wet with benzene in adsorbed phase, is transferred from hopper 65 through line 66 directly back to screw conveyor 52 and thence is returned to the bottom of column 50 for re-use.

The filtrate from filter 61 flows through line 67 to a distillation zone 68 wherein separation of benzene from the charge aromatics is effected, recovered benzene passing overhead through line 69 and into condenser 70, thence returning to recycle tank 71. The aromatic product is withdrawn from the bottom of distillation zone 68 and a portion of it is removed from the system through line 73 as one product of the process. The remainder is returned through line 55 to column 50 as reflux.

The desorbing agent which is carried into column 50 by the wet adsorbent tends to be displaced, at least to an extent, from adsorbed phase by the hydrocarbons flowing downwardly in the column and therefore will leave the column through line 54 in admixture with saturate hydrocarbons. Where the desorbing agent used is one which has a relatively high adsorption index, part of it may be carried through the entire length of the column and leave at the top as a constituent of the adsorbate. This will not prevent the desired separation from being accomplished provided the adsorbability characteristics of the desorbing agent are within the range hereinbefore specified and a sufficiently large amount of adsorbent is circulated relative to the amount of charge being treated. Where a desorbing agent is employed that has a relatively low adsorption index, it will tend to be displaced substantially completely from the adsorbent before the latter reaches the top of the column and therefore pass out of the column only through the bottom outlet line 54.

The mixture of saturate hydrocarbons and benzene from the bottom of column 50 is passed into distillation zone 73 to separate benzene from the saturate product. The recovered benzene flows through line 74 to condenser 70, thence returning to recycle tank 71. Saturate hydrocarbons in enriched form are withdrawn from the system through line 75.

In the process described above substantially any desired product purity may be obtained as to either the saturate or aromatic product or both by employing a column of sufficient height and by operating under the necessary reflux conditions. The height of column and the amount of reflux that should be used for any given degree of separation may readily be determined by engineering calculations analogous to those employed for conventional distillation processes.

It will be seen that the principles of the present invention are applicable to the separation of a great variety of organic mixtures, including not only hydrocarbons but also non-hydrocarbons. For instance, mixtures of various types of such compounds as listed in the foregoing table may be separated according to the present process. In fact the process is capable of resolving any liquid organic mixture into its component parts where the components have substantially different adsorbabilities on the particular adsorbent selected for use. It is to be understood that the invention is not limited to the treatment of binary mixtures but also embraces multi-component mixtures containing one or more compounds having adsorbabilities intermediate those of the most adsorbable and least adsorbable components. In such case the intermediate compound or compounds will tend to concentrate in one or the other of the products of the process depending upon whether the adsorptive properties more nearly approach those of the most adsorbable component or of the least adsorbable component. Products so obtained may be retreated according to the invention to effect further separation.

Having described my invention, what I claim and desire to protect by Letters Patent is:

1. Continuous process for separating a hydrocarbon charge composed of aromatic and saturate hydrocarbons into an aromatic product and a saturate product which process comprises: passing a particulate adsorbent in the form of a continuous moving bed through an elongated column having an adsorption section adjacent one end and an enriching section adjacent the other end, the adsorbent being introduced into the column at the adsorption section end and being withdrawn therefrom at the enriching section end, introducing said hydrocarbon charge in liquid phase into the column at a locus intermediate the adsorption and enriching sections and flowing it countercurrent to the adsorbent, withdrawing a liquid stream comprising charge saturate and the desorbing agent hereinafter specified adjacent the end of the column at which adsorbent is introduced, removing desorbing agent from said liquid stream by distillation to yield a saturate-rich product, withdrawing adsorbent containing adsorbed charge aromatic from the enriching section end and passing the same to a desorption zone separate from said column, therein treating the adsorbent with an aromatic hydrocarbon liquid boiling outside of the charge boiling range as desorbing agent to displace charge aromatic from the adsorbent, withdrawing a liquid stream of desorbing agent and charge aromatic from the desorption zone and removing desorbing agent therefrom by distillation to yield an aromatic-rich product, introducing a portion of said aromatic-rich product as reflux into the column adjacent the end of withdrawal of adsorbent, and returning wet adsorbent from the desorption zone directly to said column at the adsorption section end for re-use without further regeneration.

2. Process according to claim 1 wherein the adsorbent is silica gel.

3. Process according to claim 1 wherein the adsorbent is activated cabon.

4. Continuous process for separating a hydrocarbon charge composed of aromatic and saturate hydrocarbons into an aromatic product and a saturate product which process comprises: passing silica gel in the form of a continuous moving bed through an elongated column having an adsorption section adjacent one end and an enriching section adjacent the other end, the silica gel being introduced into the column at the adsorption section end and being withdrawn therefrom at the enriching section end, introducing said hydrocarbon charge in liquid phase into the column at a locus intermediate the adsorption and enriching sections and flowing it countercurrent to the silica gel, withdrawing a liquid stream comprising charge saturate and the desorbing agent hereinafter specified adjacent the end of the column at which the silica gel is introduced, removing desorbing agent from said liquid stream by distillation to yield a saturate-rich product, withdrawing silica gel containing adsorbed charge aromatic from the enriching section and passing the same to a desorption zone separate from said column, therein treating the silica gel with an aromatic hydrocarbon liquid boiling below the charge boiling range as desorbing agent to displace charge aromatic from the silica gel, withdrawing a liquid stream of desorbing agent and charge aromatic from the desorption zone and removing desorbing agent therefrom by distillation to yield an aromatic-rich product, introducing a portion of said aromatic-rich product as reflux into the column adjacent the end of withdrawal of silica gel, and returning wet silica gel from the desorption zone directly to said column at the adsortpion section end for re-use without further regeneration.

5. Process according to claim 4 wherein said desorbing agent is benzene.

JOHN L. OLSEN.

REFERENCES CITED

The following references are of record in the file of this patent:

UNITED STATES PATENTS

| Number | Name | Date |
| --- | --- | --- |
| Re. 23,005 | Lipkin | June 8, 1948 |
| 2,398,101 | Lipkin | Apr. 9, 1946 |
| 2,425,535 | Hibshman | Aug. 12, 1947 |
| 2,441,572 | Hirschler et al. | May 18, 1948 |
| 2,448,489 | Hirschler | Aug. 31, 1948 |
| 2,449,402 | Lipkin et al. | Sept. 14, 1948 |